US009590397B2

(12) United States Patent
Paul et al.

(10) Patent No.: US 9,590,397 B2
(45) Date of Patent: Mar. 7, 2017

(54) APPARATUS CONTAINING A DIELECTRIC INSULATION GAS COMPRISING AN ORGANOFLUORINE COMPOUND

(71) Applicants: Thomas Alfred Paul, Wädenswil (CH); Navid Mahdizadeh, Baden (CH); Patrick Stoller, Zürich (CH); Axel Kramer, Wettingen (CH); Oliver Cossalter, Fislisbach (CH); Stephan Grob, Baden (CH); Nitesh Ranjan, Wettingen (CH); Javier Mantilla, Baden (CH); Mathias-Dominic Buergler, Baden-Dättwil (CH); Francia Galindo-Lozano, Zürich (CH)

(72) Inventors: Thomas Alfred Paul, Wädenswil (CH); Navid Mahdizadeh, Baden (CH); Patrick Stoller, Zürich (CH); Axel Kramer, Wettingen (CH); Oliver Cossalter, Fislisbach (CH); Stephan Grob, Baden (CH); Nitesh Ranjan, Wettingen (CH); Javier Mantilla, Baden (CH); Mathias-Dominic Buergler, Baden-Dättwil (CH); Francia Galindo-Lozano, Zürich (CH)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/679,658

(22) Filed: Apr. 6, 2015

(65) Prior Publication Data
US 2015/0214701 A1 Jul. 30, 2015

Related U.S. Application Data

(63) Continuation of application No. PCT/EP2013/070834, filed on Oct. 7, 2013, and a continuation of application No. PCT/EP2012/069733, filed on Oct. 5, 2012.

(51) Int. Cl.
| | |
|---|---|
| *H02B 13/055* | (2006.01) |
| *H02B 13/045* | (2006.01) |
| *H01B 3/56* | (2006.01) |
| *H01H 33/56* | (2006.01) |

(52) U.S. Cl.
CPC ............ *H02B 13/055* (2013.01); *H01B 3/56* (2013.01); *H02B 13/045* (2013.01); *H01H 2033/566* (2013.01)

(58) Field of Classification Search
CPC ............................ H02B 13/055; H02B 13/045
USPC ...................................................... 252/571
See application file for complete search history.

(56) References Cited

U.S. PATENT DOCUMENTS

| | | | | |
|---|---|---|---|---|
| 3,871,883 | A * | 3/1975 | Hashimoto | C07D 333/24 430/81 |
| 4,173,690 | A * | 11/1979 | Giessner | C08J 3/226 521/122 |
| 7,128,133 | B2 | 10/2006 | Costello et al. | |
| 2003/0089682 | A1* | 5/2003 | Skarby | H01H 33/143 218/3 |
| 2008/0163621 | A1* | 7/2008 | Johnson | B01J 15/005 60/517 |
| 2012/0315553 | A1* | 12/2012 | Mizuno | H01M 10/052 429/403 |
| 2013/0215555 | A1* | 8/2013 | Kieffel | H02B 13/055 361/618 |
| 2013/0265392 | A1* | 10/2013 | Rhee | G06F 3/005 348/46 |
| 2013/0306655 | A1* | 11/2013 | Takushima | B01D 53/0407 220/592.25 |
| 2015/0214701 | A1* | 7/2015 | Paul | H01B 3/56 361/618 |

FOREIGN PATENT DOCUMENTS

| | | | | |
|---|---|---|---|---|
| CA | 880377 | * | 9/1971 | |
| FR | 2965120 | A1 * | 3/2012 | ........... H02B 13/055 |
| JP | 02236886 | A * | 9/1990 | |
| JP | 2007300716 | A | 11/2007 | |
| JP | WO 2011101992 | A1 * | 8/2011 | ........... H01M 10/052 |

(Continued)

OTHER PUBLICATIONS

International Preliminary Report on Patentability Application No. PCT/EP2013/070834 Completed: Sep. 18, 2014 18 pages.

(Continued)

*Primary Examiner* — Nicole M Buie-Hatcher
*Assistant Examiner* — M. Reza Asdjodi
(74) *Attorney, Agent, or Firm* — St. Onge Steward Johnston & Reens LLC

(57) ABSTRACT

An apparatus for the generation, the distribution or the usage of electrical energy, the apparatus including a housing enclosing an insulating space and an electrical component arranged in the insulating space. The insulating space contains a dielectric insulation gas including an organofluorine compound A. The apparatus further includes a molecular sieve arranged such as to come into contact with the insulation gas. The molecular sieve has an average pore size y greater than the molecular size of at least one decomposition product of the organofluorine compound A generated during operation of the apparatus. The adsorption capability of the molecular sieve for organofluorine compound A is lower than for the at least one decomposition product. The apparatus further includes at least one desiccant arranged such as to come into contact with the insulation gas.

40 Claims, 4 Drawing Sheets

(56) References Cited

FOREIGN PATENT DOCUMENTS

Figure 1:
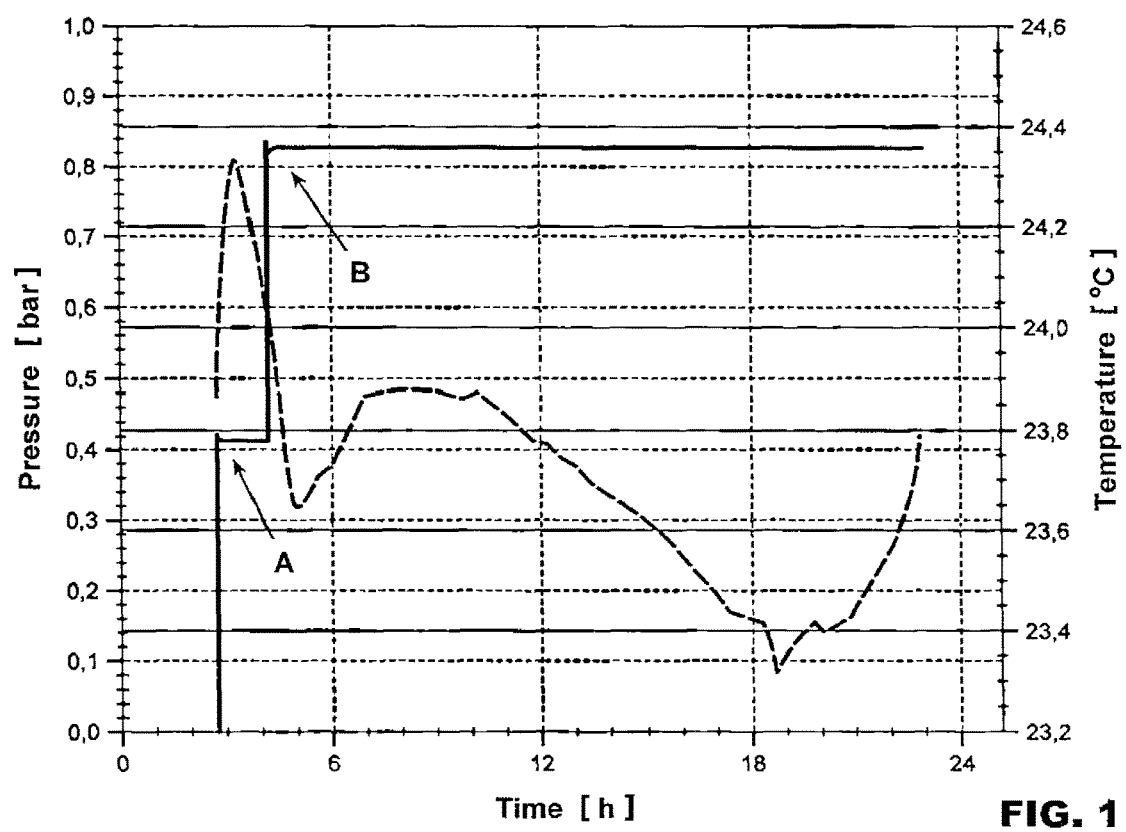

WO   2010142346  A1   12/2010
WO   2012080222  A1   6/2012

OTHER PUBLICATIONS

International Search Report and Written Opinion of the International Searching Authority Application No. PCT/EP2013/070834 Completed: Oct. 24, 2013; Mailing Date: Nov. 6, 2013 6 pages.
International Search Report and Written Opinion of the International Searching Authority Application No. PCT/EP2012/069733 Completed: May 23, 2013; Mailing Date: May 31, 2013 6 pages.

\* cited by examiner

APPARATUS CONTAINING A DIELECTRIC INSULATION GAS COMPRISING AN ORGANOFLUORINE COMPOUND

The present invention relates to an apparatus for the generation, the distribution and/or the usage of electrical energy, as well as to a method for operating such an apparatus, according to the preamble of the independent claims. In particular, the term "distribution of electrical energy" can broadly encompass transmission or distribution of electrical energy on any voltage level.

Dielectric insulation media in liquid or gaseous state are conventionally applied for the insulation of an electrical component in a wide variety of apparatuses, such as for example switchgears, gas-insulated substations (GIS), gas-insulated lines (GIL), or transformers.

In medium or high voltage metal-encapsulated switchgears, for example, the electrical component is arranged in a gas-tight housing, which defines an insulating space, said insulation space comprising an insulation gas and separating the housing from the electrical component without letting electrical current to pass through. For interrupting the current in high voltage switchgear, the insulating gas further functions as an arc extinction gas.

Recently, the use of organofluorine compounds in an insulating gas has been suggested. Specifically, WO-A-2010/142346 discloses a dielectric insulation medium comprising a fluoroketone having from 4 to 12 carbon atoms. A dielectric insulation medium comprising a hydrofluoromonoether is disclosed in WO-A-2012/080222.

Both groups of compounds have been shown to have high insulation capabilities, in particular a high dielectric strength, as well as high arc extinction capabilities. At the same time, they have a very low Global Warming Potential (GWP) and very low toxicity. The combination of these characteristics renders these organofluorine compounds highly suitable as a substitute for $SF_6$ (sulphur hexafluoride), which has commonly been used as a dielectric insulation medium, but which is known to have a high GWP.

FR 2 965 120 discloses a circuit breaker comprising a dielectric insulation gas and containing a fluoroketone, which is partially liquid and partially gaseous, and comprising means for absorbing molecular species which are formed after ionisation of the fluoroketone in an arc.

However, in particular during e.g. a switching operation, which is accompanied by a high temperature increase in the insulation space, organofluorine compounds can be subject to decomposition. The formation of decomposition products can also be due to partial discharge and can in particular occur when the moisture content in the insulation space is high. The resulting decomposition products do not readily recombine, as it is possible for some decomposition products of $SF_6$. This is of particular relevance, since one decomposition product of the organofluorine compound is hydrogen fluoride (HF), which is highly corrosive and extremely toxic.

In order to provide for a safe operation of the apparatus, the decomposition products of the organofluorine compound shall, thus, be readily removed from the insulating space.

Removal of the decomposition products can theoretically be achieved by an adsorbent to which the decomposition product adsorbs and is bound permanently.

However, in particular when using a highly polar organofluorine compound, such as a fluoroketone, the presence of an adsorbent may lead to a decrease in the amount of organofluorine compound and, thus, to a decrease in the insulation and arc extinction performance of the insulation gas.

Considering these drawbacks, the problem of the present invention is, thus, to provide an apparatus using a dielectric insulation gas comprising an organofluorine compound, said apparatus allowing its insulating space to be kept essentially free from harmful decomposition products without negatively interfering with the insulation and arc extinction performance of the insulation gas. This problem is solved by the subject matter according to the independent claims. Preferred embodiments are given in the dependent claims.

According to claim 1, the present invention relates to an apparatus for the generation, the distribution or the usage of electrical energy. The apparatus comprises a housing enclosing an insulating space and an electrical component arranged in the insulating space. The insulating space contains a dielectric insulation gas comprising an organofluorine compound A. The apparatus further comprises a molecular sieve arranged such as to come into contact with the insulation gas.

According to the present invention, the molecular sieve has an average pore size y greater than the molecular size of at least one decomposition product of the organofluorine compound A generated during operation of the apparatus, and the adsorption capability and/or absorption capability of the molecular sieve for the organofluorine compound A is lower than for the at least one decomposition product.

The present invention thus allows for selective removal of the decomposition product(s) from the insulation space, while leaving the organofluorine compound A unadsorbed and/or unabsorbed, and thus leaving the insulation and arc extinction capabilities of the insulation gas at least approximately unaffected or at least approximately not negatively affected.

The term "adsorption capability" shall encompass any adsorption processes, such as physisorption and/or chemisorption. Physisorption can, in particular, be determined or be influenced by the relationship between the size of molecules of the dielectric medium and the pore size of the molecular sieve. Chemisorption can, in particular, be determined or be influenced by chemical, typically reversal, interactions between molecules of the dielectric medium and the molecular sieve.

The term "housing" as used in the context of the present invention is to be understood broadly as any at least approximately closed system. In particular, the term encompasses a plurality of chambers interconnected with each other. More particularly, "housing" encompasses a chamber, in which the electrical component is contained and which can be interconnected with a recycling system through which the dielectric insulation gas is removed, processed (e.g. cleaned) and reintroduced into the chamber. "Housing" further comprises a chamber, in which the electrical component is contained and which can be interconnected with a pre-treatment chamber for pre-treating the dielectric insulation gas prior to introduction into the chamber.

Also, the term "arranged such as to come into contact with the insulation gas" is to be understood broadly and encompasses both embodiments where there is a permanent contact of the molecular sieve with the insulation gas as well as embodiments in which there is only a temporary contact.

The term "decomposition products" relates to compounds comprising less atoms than organofluorine compound A from which they are generated and thus in most cases also having a molecular size which is substantially smaller than the molecular size of the organofluorine compound A.

According to an embodiment, the organofluorine compound A has a lower energy of adsorption (i.e. physical or chemical binding energy) and/or absorption (i.e. chemical binding energy) to the molecular sieve than the at least one decomposition product. Thus, the forces acting between the adsorbed and/or absorbed compound and the molecular sieve (in particular van der Waals forces, such as London dispersion forces, dipole-induced dipole, dipole-dipole and quadrupole interactions, as well covalent bonding forces) are weaker for organoflourine compound A than for the at least one decomposition product.

Additionally or alternatively, also the pore size of the molecular sieve can be chosen such that its adsorption capability and/or absorption capability for organofluorine compound A is lower than for the decomposition product. More particularly, the pore size is chosen small enough to keep organofluorine compound A out of the pores and thus to prevent adsorption and/or absorption to the pore surface.

In this regard, it has been found that the molecular sieve in embodiments has an average pore size y smaller than 15 Å, preferably smaller than 13 Å, more preferably smaller than 11 Å, more preferably equal to or smaller than 9 Å, preferably smaller than 7 Å, more preferably smaller than 6 Å and most preferably of about 5 Å. Specifically, a fluoroketone having five carbon atoms or more does not enter a pore of a size of smaller than 9 Å and therefore does not adsorb to such a pore surface and/or is not absorbed by such a pore surface.

According to other embodiments of the present invention, the molecular sieve is at least temporarily charged with the organofluorine compound A, meaning that the content of organofluorine compound A in the molecular sieve is higher than its content in the dielectric insulation gas in equilibrium at operational conditions of the apparatus. In this embodiment, the organofluorine compound A is not kept from entering the pores of the molecular sieve, but on the contrary is forced into the molecular sieve, in particular by exposing the latter to a gas in which the partial pressure of the organofluorine compound A is higher than in the dielectric insulation gas present during operation of the apparatus. During operation of the apparatus, the organofluorine compound A charging the molecular sieve is at least partially displaced by the at least one decomposition product adsorbing to the molecular sieve and/or being absorbed by the molecular sieve. The molecular sieve according to this embodiment, thus, functions simultaneously as a "reservoir" for the organofluorine compound A as well as a "sink" for the decomposition product.

In embodiments to allow the at least one decomposition product as well as water to be efficiently removed, the molecular sieve has an average pore y which is at least 2.7 Å, preferably at least 2.8 Å, more preferably at least 2.9 Å, most preferably at least 3 Å. It has been found that this pore size is sufficient for achieving good permeation of the at least one decomposition product and water into the molecular sieve and thus good adsorption on and/or absorption by the pore surface. The removal of water is of high relevance, not only in view of a reduced formation of decomposition products, but also in view of preventing the solid components of the electrical apparatus, in particular the moveable parts, from corroding.

In other embodiments, the molecular sieve is a zeolite, i.e. a microporous, aluminosilicate mineral that has undergone cation exchange to achieve a desired pore size. Suitable zeolites include ZEOCHEM® molecular sieve 3A (having a pore size of 3 Å), 4A (having a pore size of 4 Å) and 5A (having a pore size of 5 Å).

In yet further embodiments, suitable zeolites can include e.g. ZEOCHEM® molecular sieve 13X (having a pore size of about 9 Å). This can improve the "reservoir" capacity e.g. for C5-fluoroketone while maintaining the adsorption capacity and/or absorption capacity for decomposition products, in particular when the molecular sieve is at least partly or even fully protected against water sorption by at least one desiccant being additionally present in the apparatus. A larger pore size of 9 Å or more, in particular up to 15 Å, can also be useful when larger molecules than the C5-fluoroketone are comprised in the organofluorine compound A.

According to the present invention, the apparatus further comprises at least one desiccant arranged such as to come into contact with the insulation gas. This desiccant is different from the molecular sieve defined above.

In particular, the at least one desiccant is one which specifically adsorbs (or absorbs) water. More preferably, the at least one desiccant has a higher hydrophilicity than the molecular sieve, meaning that it has a higher tendency to bind water than the molecular sieve, and/or the at least one desiccant binds water irreversibly under normal operating conditions of the apparatus. In other words, the desiccant is more hygroscopic than the molecular sieve. Thus, the desiccant serves for protecting the molecular sieve from water or moisture.

Due to the hydrophilicity of the desiccant, water is efficiently removed from the insulating space. Thus, the surface of the molecular sieve is not overloaded by water molecules, which overload might impede, in particular in a relatively humid insulating space, the performance of the molecular sieve in removing the at least one decomposition product and might lead to the decomposition product being adsorbed and/or absorbed inefficiently.

In embodiments, the at least one desiccant is of a different type than a molecular sieve, i.e. the desiccant itself is not a molecular sieve. In further more specific embodiments, the desiccant is not any of the group consisting of: aluminium, aluminium oxide, activated alumina, activated carbon, zeolite, and combinations thereof. These embodiments can apply to any aspect of the invention.

In embodiments, the at least one desiccant is selected from the group consisting of: calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, aluminium, lithium aluminium hydride, aluminium oxide, activated alumina, montmorrilonite, phosphorpentoxide, silica gel and a cellulose filter.

It is thereby particularly preferred that the at least one desiccant is selected from the group consisting of: calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, lithium aluminium hydride, montmorrilonite, phosphorpentoxide, silica gel and a cellulose filter.

Among these, calcium sulphate, magnesium sulphate and sodium sulphate are particularly preferred.

The present invention encompasses both embodiments in which only one desiccant is comprised in the apparatus as well as embodiments in which two or more desiccants (i.e. two or more different types of desiccants) are comprised.

According to an embodiment, the at least one desiccant and/or the molecular sieve (whichever is present, and in particular to which it may apply) is comprised in a region of the apparatus having a temperature lower than the average temperature present in the apparatus at operational conditions. By this embodiment, gas decomposition processes that might occur on the desiccant and/or on the molecular sieve due to surface catalysis can be significantly decelerated or avoided. In particular, the desiccant and/or the molecular sieve can be comprised in a region to which cooling means, more particularly external cooling means, are attributed.

It is in this regard further preferred that the desiccant and/or the molecular sieve is or are comprised in a region of the apparatus having a temperature less than 40 K (Kelvin) above ambient temperature, more preferably less than 20 K (Kelvin) above ambient temperature.

According to an aspect of the invention and according to preferred embodiments, the desiccant and/or the molecular sieve (whichever is present, and in particular to which it may apply) is or are in powder form. Particularly, the desiccant and/or molecular sieve is or are designed to be at least essentially free, in particular free, of any binder in order to avoid potential issues regarding material compatibility inside the apparatus. In particular, the binder provides unwanted adsorption sites for capturing water which is then available for unwanted reaction with the organofluorine compound, in particular C5-ketone or C5-fluoroketone (C5FK). Destruction of C5FK molecules could then ultimately degrade the dielectric strength of the insulation gas. Therefore, leaving out the binder material can be favourable.

In all aspects of the invention, it is further particularly preferred that the at least one desiccant and/or molecular sieve (whichever is present) is or are comprised in a permeable container, and/or is or are arranged on a carrier, thus allowing an intensive contact between the desiccant and/or the molecular sieve, respectively, with the insulation gas.

In embodiments, this permeable container or carrier can have the form of e.g. a tube, roll, fabric, lamella or honeycomb.

According to an embodiment, the at least one desiccant and/or molecular sieve is comprised in at least one permeable container, the cover of which is permeable at least for water and more particularly is a semipermeable membrane, which is selectively permeable for water. In this embodiment, the permeable container can e.g. form a sachet.

According to an embodiment, two or more permeable containers, specifically sachets, are arranged in a frame or holder in a manner spaced apart from each other. Due to the gaps formed between the permeable containers, and thus due to their freely exposed surface area, high gas permeation into the interior of the container and thus a good contact of the at least one desiccant and/or molecular sieve with the insulation gas can be achieved.

In a specific embodiment, the permeable containers are arranged in a cuboid frame, and more particularly are arranged parallel to each other. If the permeable container is a sachet, it is typically lined by a fabric.

According to further embodiments, the permeable containers, specifically the sachets, are flexible and are loosely arranged concentrically in a concentric holder.

According to other embodiments, the organofluorine compound A is selected from the group consisting of: fluoroethers, in particular hydrofluoromonoethers, fluoroketones and fluoroolefins, in particular hydrofluoroolefins, and mixtures thereof. These classes of compounds have been found to have very high insulation capabilities, in particular a high dielectric strength (or breakdown field strength), and at the same time a low GWP and low toxicity.

The invention encompasses both embodiments in which the dielectric insulation gas comprises either one of a fluoroether, in particular a hydrofluoromonoether, a fluoroketone and a fluoroolefin, in particular a hydrofluoroolefin, as well as embodiments in which it comprises a mixture of at least two of these compounds.

The term "fluoroether" as used in the context of the present invention encompasses both perfluoroethers, i.e. fully fluorinated ethers, and hydrofluoroethers, i.e. ethers that are only partially fluorinated. The term further encompasses saturated compounds as well as unsaturated compounds, i.e. compounds including double and/or triple bonds. The at least partially fluorinated alkyl chains attached to the oxygen atom of the fluoroether can be, independently of each other, linear or branched.

The term "fluoroethers" encompasses both non-cyclic and cyclic ethers. Thus, the two alkyl chains attached to the oxygen atom can optionally form a ring. In particular, the term encompasses fluorooxiranes. In a specific embodiment, the organofluorine compound A according to the present invention is a perfluorooxirane or a hydrofluorooxirane, more specifically a perfluorooxirane or hydrofluorooxirane comprising from three to fifteen carbon atoms.

According to other embodiments, the dielectric insulation gas comprises a hydrofluoromonoether containing at least three carbon atoms. Apart from their high dielectric strength, these hydrofluoromonoethers are chemically and thermally stable up to temperatures above 140° C. They are further non-toxic or have a low toxicity level. In addition, they are non-corrosive and non-explosive.

The term "hydrofluoromonoether" as used herein refers to a compound having one and only one ether group, said ether group linking two alkyl groups, which can be, independently from each other, linear or branched, and which can optionally form a ring. The compound is thus in clear contrast to the compounds disclosed in e.g. U.S. Pat. No. 7,128,133, which relates to the use of compounds containing two ether groups, i.e. hydrofluorodiethers, in heat-transfer fluids.

The term "hydrofluoromonoether" as used herein is further to be understood such that the monoether is partially hydrogenated and partially fluorinated. It is further to be understood such that it may comprise a mixture of differently structured hydrofluoromonoethers. The term "structurally different" shall broadly encompass any difference in sum formula or structural formula of the hydrofluoromonoether.

As mentioned above, hydrofluoromonoethers containing at least three carbon atoms have been found to have a relatively high dielectric strength. Specifically, the ratio of the dielectric strength of the hydrofluoromonoethers according to the present invention to the dielectric strength of $SF_6$ is greater than about 0.4.

As also mentioned, the GWP of the hydrofluoromonoethers is low. Preferably, the GWP is less than 1,000 over 100 years, more specifically less than 700 over 100 years.

The hydrofluoromonoethers mentioned herein have a relatively low atmospheric lifetime and in addition are devoid of halogen atoms that play a role in the ozone destruction catalytic cycle, namely Cl, Br or I. Their ODP is zero, which is very favourable from an environmental perspective.

The preference for a hydrofluoromonoether containing at least three carbon atoms and thus having a relatively high boiling point of more than −20° C. is based on the finding that a higher boiling point of the hydrofluoromonoether generally goes along with a higher dielectric strength.

According to other embodiments, the hydrofluoromonoether contains exactly three or four or five or six carbon atoms, in particular exactly three or four carbon atoms, most preferably exactly three carbon atoms.

More particularly, the hydrofluoromonoether is thus at least one compound selected from the group consisting of the compounds defined by the following structural formulae in which a part of the hydrogen atoms is substituted by a fluorine atom:

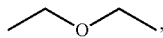 (Oa)

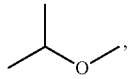 (Ob)

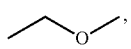 (Oc)

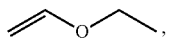 (Od)

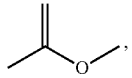 (Oe)

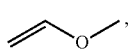 (Of)

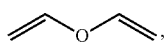 (Og)

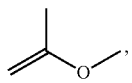 (Oh)

 (Oi)

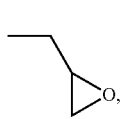 (Oj)

 (Ok)

 (Ol)

 (Om)

 (On)

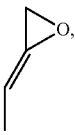 (Oo)

 (Op)

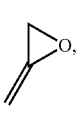 (Oq)

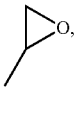 (Or)

By using a hydrofluoromonoether containing three or four carbon atoms, no liquefaction occurs under typical operational conditions. Thus, a dielectric insulation medium, every component of which is in the gaseous state at operational conditions of the apparatus, can be achieved.

Considering flammability of the compounds, it is further advantageous that the ratio of the number of fluorine atoms to the total number of fluorine and hydrogen atoms, here briefly called "F-rate", of the hydrofluoromonoether is at least 5:8. It has been found that compounds falling within this definition are generally non-flammable and thus result in an insulation medium complying with highest safety requirements. Thus, safety requirements of the electrical insulator and the method of its production can readily be fulfilled by using a corresponding hydrofluoromonoether.

According to other embodiments, the ratio of the number of fluorine atoms to the number of carbon atoms, here briefly called "F/C-ratio", ranges from 1.5:1 to 2:1. Such compounds generally have a GWP of less than 1,000 over 100 years and are thus very environment-friendly. It is particularly preferred that the hydrofluoromonoether has a GWP of less than 700 over 100 years.

According to other embodiments of the present invention, the hydrofluoromonoether has the general structure (O)

$$C_aH_bF_c\text{---}O\text{---}C_dH_eF_f \qquad (O)$$

wherein a and d independently are an integer from 1 to 3 with a+d=3 or 4 or 5 or 6, in particular 3 or 4, b and c independently are an integer from 0 to 11, in particular 0 to 7, with b+c=2a+1, and e and f independently are an integer from 0 to 11, in particular 0 to 7, with e+f=2d+1, with further at least one of b and e being 1 or greater and at least one of c and f being 1 or greater.

It is thereby a preferred embodiment that in the general structure or formula (O) of the hydrofluoromonoether: a is 1, b and c independently are an integer ranging from 0 to 3 with b+c=3, d=2, e and f independently are an integer ranging from 0 to 5 with e+f=5, with further at least one of b and e being 1 or greater and at least one of c and f being 1 or greater.

According to a more preferred embodiment, exactly one of c and f in the general structure (O) is 0. The corresponding grouping of fluorines on one side of the ether linkage, with the other side remaining unsubstituted, is called "segregation". Segregation has been found to reduce the boiling point compared to unsegregated compounds of the same chain length. This feature is thus of particular interest, because compounds with longer chain lengths allowing for higher dielectric strength can be used without risk of liquefaction under operational conditions.

Most preferably, the hydrofluoromonoether is selected from the group consisting of pentafluoro-ethyl-methyl ether ($CH_3$—O—$CF_2CF_3$) and 2,2,2-trifluoroethyl-trifluoromethyl ether ($CF_3$—O—$CH_2CF_3$).

Pentafluoro-ethyl-methyl ether has a boiling point of +5.25° C. and a GWP of 697 over 100 years, the F-rate being 0.625, while 2,2,2-trifluoroethyl-trifluoromethyl ether has a boiling point of +11° C. and a GWP of 487 over 100 years, the F-rate being 0.75. They both have an ODP of 0 and are thus environmentally fully acceptable.

In addition, pentafluoro-ethyl-methyl ether has been found to be thermally stable at a temperature of 175° C. for 30 days and therefore to be fully suitable for the operational conditions given in the apparatus. Since thermal stability studies of hydrofluoromonoethers of higher molecular weight have shown that ethers containing fully hydrogenated methyl or ethyl groups have a lower thermal stability compared to those having partially hydrogenated groups, it can be assumed that the thermal stability of 2,2,2-trifluoro-ethyl-trifluoromethyl ether is even higher.

Hydrofluoromonoethers in general, and pentafluoro-ethyl-methyl ether as well as 2,2,2-trifluoroethyl-trifluoromethyl ether in particular, display a low risk of human toxicity. This can be concluded from the available results of mammalian HFC (hydrofluorocarbon) tests. Also, information available on commercial hydrofluoromonoethers do not give any evidence of carcinogenicity, mutagenicity, reproductive/developmental effects and other chronic effects of the compounds of the present application. Based on the data available for commercial hydrofluoro ethers of higher molecular weight, it can be concluded that the hydrofluoromonoethers, and in particular pentafluoro-ethyl-methyl ether as well as 2,2,2-trifluoroethyl-trifluoromethyl ether, have a lethal concentration LC 50 of higher than 10,000 ppm, rendering them suitable also from a toxicological point of view.

The hydrofluoromonoethers mentioned have a higher dielectric strength than air. In particular, pentafluoro-ethyl-methyl ether has a dielectric strength about 2.4 times higher than that of air at 1 bar.

Given its boiling point, which is preferably below 55° C., more preferably below 40° C., in particular below 30° C., the hydrofluoromonoethers mentioned, particularly pentafluoro-ethyl-methyl ether and 2,2,2-trifluoroethyl-trifluoromethyl ether, respectively, are normally in the gaseous state at operational conditions. Thus, a dielectric insulation medium in which every component is in the gaseous state at operational conditions of the apparatus can be achieved, which is advantageous.

Alternatively or additionally to the hydrofluoromonoethers mentioned above, the dielectric insulation gas comprises a fluoroketone containing from four to twelve carbon atoms.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds. The at least partially fluorinated alkyl chain of the fluoroketones can be linear or branched. In exemplary embodiments, the fluoroketone is a perfluoroketone. In further exemplary embodiment, the fluoroketone has a branched alkyl chain, in particular an at least partially fluorinated alkyl chain. In still further exemplary embodiments, the fluoroketone is a fully saturated compound.

Compared to fluoroketones having a greater chain length with more than six carbon atoms, fluoroketones containing five or six carbon atoms have the advantage of a relatively low boiling point. Thus, problems which might go along with liquefaction can be avoided, even when the apparatus is used at low temperatures.

According to embodiments, the fluoroketone is at least one compound selected from the group consisting of the compounds defined by the following structural formulae in which at least one hydrogen atom is substituted with a fluorine atom:

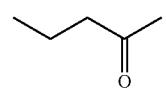

(Ia)

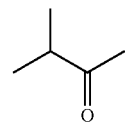

(Ib)

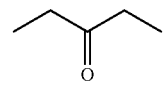

(Ic)

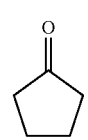

(Id)

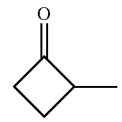

(Ie)

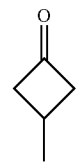

(If)

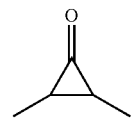

(Ig)

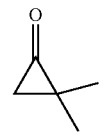

(Ih)

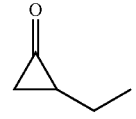

(Ii)

Fluoroketones containing five or more carbon atoms are further advantageous, because they are generally non-toxic with outstanding margins for human safety. This is in contrast to fluoroketones having less than four carbon atoms, such as hexafluoroacetone (or hexafluoropropanone), which are toxic and very reactive. In particular, fluoroketones containing exactly five carbon atoms, herein briefly named fluoroketones a), and fluoroketones containing exactly six carbon atoms are thermally stable up to 500° C.

In embodiments of this invention, the fluoroketones, in particular fluoroketones a), having a branched alkyl chain are preferred, because their boiling points are lower than the boiling points of the corresponding compounds (i.e. compounds with same molecular formula) having a straight alkyl chain.

According to embodiments, the fluoroketone a) is a perfluoroketone, in particular has the molecular formula $C_5F_{10}O$, i.e. is fully saturated without double or triple bonds. The fluoroketone a) may more preferably be selected from the group consisting of 1,1,1,3,4,4,4-heptafluoro-3-(trifluoromethyl)butan-2-one (also named decafluoro-2-methylbutan-3-one), 1,1,1,3,3,4,4,5,5,5-decafluoropentan-2-one, 1,1,1,2,2,4,4,5,5,5-decafluoropentan-3-one and octafluorocylcopentanone, and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

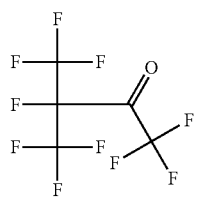
(I)

1,1,1,3,4,4,4-heptafluoro-3-(trifluoromethyl)butan-2-one, here briefly called "C5-ketone", with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with a dielectric carrier gas, has very low GWP and has a low boiling point. It has an ODP of 0 and is practically non-toxic.

According to embodiments, even higher insulation capabilities can be achieved by combining the mixture of different fluoroketone components. In embodiments, a fluoroketone containing exactly five carbon atoms, as described above and here briefly called fluoroketone a), and a fluoroketone containing exactly six carbon atoms or exactly seven carbon atoms, here briefly named fluoroketone c), can favourably be part of the dielectric insulation at the same time. Thus, an insulation medium can be achieved having more than one fluoroketone, each contributing by itself to the dielectric strength insulation medium.

In embodiments, the further fluoroketone c) is at least one compound selected from the group consisting of the compounds defined by the following structural formulae in which at least one hydrogen atom is substituted with a fluorine atom:

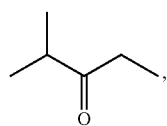
(IIa)

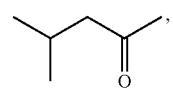
(IIb)

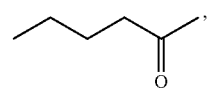
(IIc)

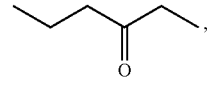
(IId)

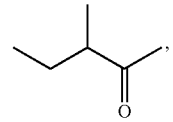
(IIe)

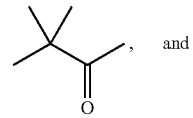
(IIf)

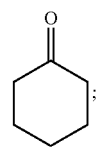
(IIg)

as well as any fluoroketone having exactly 6 carbon atoms, in which the at least partially fluorinated alkyl chain of the fluoroketone forms a ring, which is substituted by one or more alkyl groups (IIh);

and/or is at least one compound selected from the group consisting of the compounds defined by the following structural formulae in which at least one hydrogen atom is substituted with a fluorine atom:

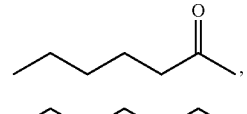
(IIIa)

(IIIb)

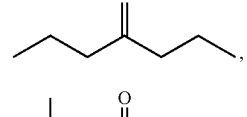
(IIIc)

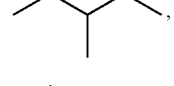
(IIId)

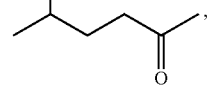
(IIIe)

-continued

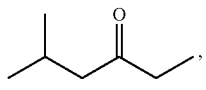 (IIIf)

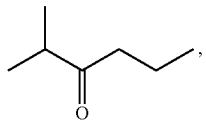 (IIIg)

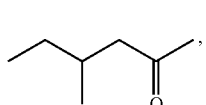 (IIIh)

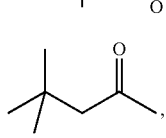 (IIIi)

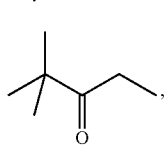 (IIIj)

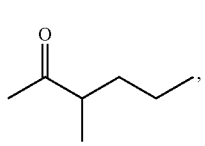 (IIIk)

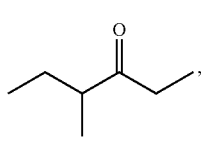 (IIIl)

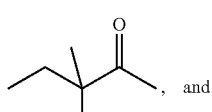 (IIIm), and

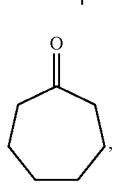 (IIIn)

in particular dodecafluoro-cycloheptanone,
as well as any fluoroketone having exactly 7 carbon atoms, in which the at least partially fluorinated alkyl chain of the fluoroketone forms a ring, which is substituted by one or more alkyl groups (IIIo).

The present invention also encompasses, in particular, each combination of any of the compounds according to structural formulae Ia to Id with any of the compounds according to structural formulae IIa to IIg and/or IIIa to IIIn. As well, the present invention encompasses each compound or each combination of compounds selected from the group consisting of the compounds according to structural formulae (Ia) to (Ii), (IIa) to (IIh), (IIIa) to (IIIo), and mixtures thereof.

Depending on the specific application of the apparatus of the present invention, a fluoroketone containing exactly six carbon atoms (falling under the designation "fluoroketone c)" mentioned above) may be preferred; such a fluoroketone is non-toxic, with outstanding margins for human safety.

In embodiments, fluoroketone c), alike fluoroketone a), is a perfluoroketone, and/or has a branched alkyl chain, in particular an at least partially fluorinated alkyl chain, and/or the fluoroketone c) contains fully saturated compounds. In particular, the fluoroketone c) has the molecular formula $C_6F_{12}O$, i.e. is fully saturated without double or triple bonds. More preferably, the fluoroketone c) can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,4,4,4-hexafluoro-3,3-bis-(trifluoromethyl)butan-2-one (also named dodecafluoro-3,3-(dimethyl)butan-2-one), dodecafluorohexan-2-one, dodecafluorohexan-3-one and decafluorocyclohexanone, and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one) can be represented by the following structural formula (II):

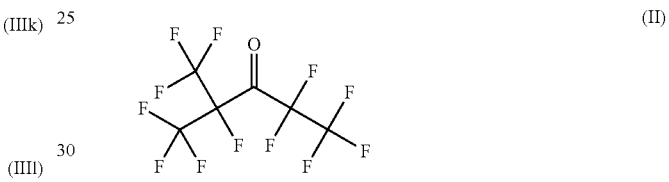 (II)

1,1,1,2,4,4,5,5,5-Nonafluoro-4-(trifluoromethyl)pentan-3-one (here briefly called "C6-ketone", with molecular formula $C_2F_5C(O)C(CF_3)_2$ has been found to be particularly preferred for high voltage insulation applications because of its high insulating properties and its extremely low GWP. Specifically, its pressure-reduced breakdown field is around 240 kV/cm/bar, which is much higher than the one of air having a poor dielectric strength ($E_{cr}$=25 kV/cm/bar). It has an ozone depletion potential of 0 and is non-toxic (LC50 of about 100,000 ppm). Thus, the environmental impact is low, and at the same time outstanding margins for human safety are achieved.

As mentioned above, the organofluorine compound can also be a fluoroolefin, in particular a hydrofluoroolefin. More particularly, the fluoroolefin or hydrofluorolefin, respectively, contains exactly three carbon atoms.

According to a particularly preferred embodiment, the hydrofluoroolefin is, thus, selected from the group consisting of: 1,1,1,2-tetrafluoropropene (HFO-1234yf), 1,2,3,3-tetrafluoro-2-propene (HFO-1234yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zc), (Z)1,1,1,3-tetrafluoropropene (HFO-1234zeZ), (Z)1,1,2,3-tetrafluoro-2-propene (HFO-1234yeZ), (E)1,1,1,3-tetrafluoropropene (HFO-1234zeE), (E)1,1,2,3-tetrafluoro-2-propene (HFO-1234yeE), (Z)1,1,1,2,3-pentafluoropropene (HFO-1225yeZ), (E)1,1,1,2,3-pentafluoropropene (HFO-1225yeE) and mixtures thereof.

According to embodiments of the invention, the dielectric insulation gas further comprises a carrier gas. More preferably, the dielectric insulation gas comprises the organofluorine compound, particularly a fluoroketone having exactly five carbon atoms, at a partial pressure corresponding to the vapour pressure of the organofluorine compound at the minimum operating temperature of the apparatus, with the remainder of the dielectric insulation gas being or comprising the carrier gas. Thus, the organofluorine compound A, particularly a fluoroketone having exactly five carbon atoms, is present in fully gaseous phase in the insulation space.

In this regard, it is preferred that the carrier gas comprises an air component. In particular, the carrier gas shall be selected from the group consisting of: oxygen ($O_2$), nitrogen ($N_2$), carbon dioxide ($CO_2$), and air. In particular, the carrier gas can be a mixture of $N_2$ and $O_2$, or the carrier gas can be a mixture of $CO_2$ and $O_2$. Alternatively or additionally, the carrier gas can also comprise a noble gas, and/or nitric oxide, and/or nitrogen dioxide.

According to embodiments, the carrier comprises $O_2$, since this allows to efficiently avoid or reduce the formation of harmful decomposition products. When the carrier gas comprises $O_2$, the partial pressure of $O_2$ is preferably at least about twice that of the partial pressure of the organofluorine compound. In particular for switching applications, the carrier gas can comprise $CO_2$.

The technical effects on which the present invention is based, namely the efficient removal of at least one decomposition product without interfering with the insulation and arc extinction performance of the organofluorine-compound-comprising dielectric insulation gas, are of particular relevance for an apparatus in which the housing encloses the insulation space in a gas-tight manner. It is further preferred that the apparatus is one in which the electrical component is a high voltage or medium voltage unit.

In embodiments, the apparatus, in particular gas-insulated apparatus, relates to: a switchgear, in particular a gas-insulated metal (or otherwise)-encapsulated switchgear (GIS), or a part and/or component thereof. Particularly, the apparatus can be a bus bar, a bushing, a cable, a gas-insulated cable, a cable joint, a gas-insulated line (GIL), a transformer, a current transformer, a voltage transformer, a surge arrester, an earthing switch, a disconnector, a combined disconnector and earthing switch, a load-break switch, a circuit breaker, and/or any type of gas-insulated switch; high voltage apparatus, medium voltage apparatus, low voltage apparatus, direct-current apparatus, air-insulated insulator, gas-insulated metal-encapsulated insulator, sensors, capacitor, inductance, resistor, current limiter, high voltage switch, gas circuit breaker, vacuum circuit breaker, generator circuit breaker, medium voltage switch, ring main unit, recloser, sectionalizer, low voltage switch, distribution transformer, power transformer, tap changer, transformer bushing, power semiconductor device, power converter, converter station, convertor building, computing machine; and components and/or combinations of such devices.

The molecular sieve and optionally the desiccant can be arranged in a chamber (as part of the housing) in which the electrical component is contained, as well as in a recycling system and/or pre-treatment chamber (forming further parts of the housing).

According to embodiments, the housing comprises a chamber in which the electrical component is contained and a recycling system comprising the molecular sieve and optionally the desiccant, e.g. the cellulose filters.

In embodiments, the desiccant is arranged in the recycling system, in particular in the chamber, such that the dielectric insulation gas in a first step comes into contact with the desiccant to reduce or eliminate moisture and only afterwards (or at least to a larger percentage or majority afterwards) in a second step comes into contact with the molecular sieve to reduce or eliminate decomposition products.

In embodiments, the recycling system is equipped with a compressor and a pump for pumping the dielectric insulation gas through at least one filter comprising the molecular sieve and optionally the desiccant. After that, the dried and cleaned dielectric insulation gas can be re-introduced into the chamber. During the operation, the humidity, density, pressure and/or content of decomposition product(s) are measured, e.g. by gas chromatography and/or infrared spectroscopy, and controlled by a respective (multi-) sensor system. An electric apparatus of such embodiments is particularly preferred as it allows cleaning and/or drying of the dielectric insulation gas without evacuation of the insulation space.

In more general terms, the housing comprises a chamber, in which the electrical component is contained, and a recycling system comprising at least one of the molecular sieve and the desiccant (whichever is present), and the housing is equipped with a compressor and a pump for pumping the dielectric insulation gas through at least one filter comprising the at least one of the molecular sieve and the desiccant.

If required, means for introducing carrier gas components adsorbing to and/or being absorbed by the molecular sieve and/or the desiccant (whichever is present) can be provided.

In embodiments, the means for introducing the carrier gas components are means for refilling after commissioning or during operation of the apparatus the carrier gas components adsorbing to and/or being absorbed by the molecular sieve and/or the desiccant. The means for refilling may for example be implemented by or be in connection with the above-mentioned recycling system. In further embodiments, means for introducing $CO_2$, in particular means for refilling $CO_2$ during operation of the apparatus, can be provided for compensating the amount of $CO_2$ that is adsorbed and/or absorbed. This allows to reduce a pressure swing in the apparatus or to avoid a lock-out of the apparatus due to low pressure of the dielectric insulation gas present in the apparatus for generation, distribution and/or usage of electrical energy.

In particular with regard to the further above described embodiment, in which the molecular sieve is at least temporarily charged with the organofluorine compound A, the present invention further relates to a method for operating an apparatus as described above, said method comprising a step of charging the molecular sieve with the organofluorine compound A, in particular comprising the step or steps of:
  temporarily exposing the molecular sieve to a gas in which the partial pressure of the organofluorine compound A is higher than in the dielectric insulation gas present during operation of the apparatus; and/or
  cooling the molecular sieve to a temperature below a temperature present during operation of the apparatus, and exposing the cooled molecular sieve to a gas comprising the organofluorine compound; and/or
  contacting the molecular sieve with a liquid comprising the organoflourine compound,
in order to charge the molecular sieve with the organofluorine compound A.

It is thereby particularly preferred that during operation of the apparatus, the organofluorine compound A charging the molecular sieve is at least partially displaced by the at least one decomposition product adsorbing to the molecular sieve and/or being absorbed by the molecular sieve.

In embodiments of the method of operating the apparatus, the molecular sieve can be arranged in a temperature-controlled environment, in particular in a heatable environment, inside the housing, wherein a temperature of the molecular sieve is controlled such that a predeterminable amount of charged organofluorine compound A can be released at a predeterminable instant or occasion from the molecular sieve. This allows to regulate the amount of organofluorine compound A in the dielectric insulation gas, and/or to free the molecular sieve from at least a portion of the organofluorine compound A and thus to provide additional adsorption capacity in the molecular sieve to adsorb and/or absorb decomposition products. Thus, the temperature control and, in particular, heating control of the molecular sieve enhances its performance and flexibility as a reservoir for the organofluorine compound A and as a sink or trap for the or a specific decomposition product.

In corresponding embodiments of the apparatus, the apparatus comprises temperature control means for controlling a temperature of the molecular sieve. In particular, the apparatus comprises heating means for heating the molecular sieve. The temperature control means or heating means are operable such that a predeterminable amount of charged organofluorine compound A is releasable from the molecular sieve at a predeterminable instant or occasion, in particular for regulating an amount of the organofluorine compound A in the dielectric insulation gas and/or for freeing the molecular sieve from at least a portion of the organofluorine compound A.

According to a further aspect, the present invention also relates to an apparatus for the generation, the distribution and/or the usage of electrical energy, in particular according to embodiments disclosed herein, with the apparatus comprising a housing enclosing an insulating space and an electrical component being arranged in the insulating space, wherein the insulating space contains a dielectric insulation gas comprising an organofluorine compound A, characterized in that the apparatus further comprises a desiccant arranged such as to come into contact with the insulation gas. Herein, the at least one desiccant is selected from the group consisting of: calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, lithium aluminium hydride, montmorillonite, phosphorpentoxide, silica gel and a cellulose filter.

This subject-matter is by itself suitable for solving the problem of the present invention. It has been found that the generation of toxic and corrosive decomposition products from the organofluorine compound A is generally due to the exposure of the compound to partial discharge and/or arcing in the presence of water. Thus, by reducing the water content using the desiccant, also the generation of these decomposition products is reduced. Furthermore, the reduction in the water content prevents the solid components of the electrical apparatus, in particular the moveable parts, from corroding, which further contributes to the safe operation of the apparatus.

It has further been found that the desiccant mentioned herein is fully compatible with the organofluorine compound A and that the combination of the two does not lead to any negative effects with regard to their performance.

The preferred features mentioned above for the subject matter comprising a molecular sieve likewise apply to the subject matter comprising a desiccant without a molecular sieve.

In specific embodiments, the desiccant is not any of the group consisting of: aluminium, aluminium oxide, activated alumina, activated carbon, zeolite, and combinations thereof.

In embodiments of the further aspect of the invention, the above-mentioned specific desiccants of the further aspect of the invention can also be combined with a molecular sieve being different from the desiccant and of any type and pore size that is arranged such as to come into contact with the insulation gas.

A third aspect of the invention relates to an apparatus for the generation, the distribution and/or the usage of electrical energy, in particular as described above, said apparatus comprising a housing enclosing an insulating space and an electrical component arranged in the insulating space, said insulating space containing a dielectric insulation gas comprising an organofluorine compound A, wherein the apparatus further comprises at least one of a molecular sieve and a desiccant arranged such as to come into contact with the insulation gas, and that at least one of the at least one of the molecular sieve and the desiccant is or are in powder form.

The preferred features mentioned above for the subject matter comprising a molecular sieve or a desiccant without a molecular sieve likewise apply to the subject matter of the third aspect of molecular sieve and/or desiccant in powder form. In particular, the molecular sieve can have an average pore size y greater than the molecular size of at least one decomposition product of the organofluorine compound A generated during operation of the apparatus, and the adsorption capability and/or absorption capability of the molecular sieve for the organofluorine compound A can be lower than for the at least one decomposition product. Further in particular, the at least one desiccant can be selected from the group consisting of: calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, aluminium, lithium aluminium hydride, aluminium oxide, activated alumina, montmorillonite, phosphorpentoxide, silica gel and a cellulose filter.

In specific embodiments of the third aspect, the at least one of a molecular sieve and a desiccant is not activated carbon.

Figure 2:
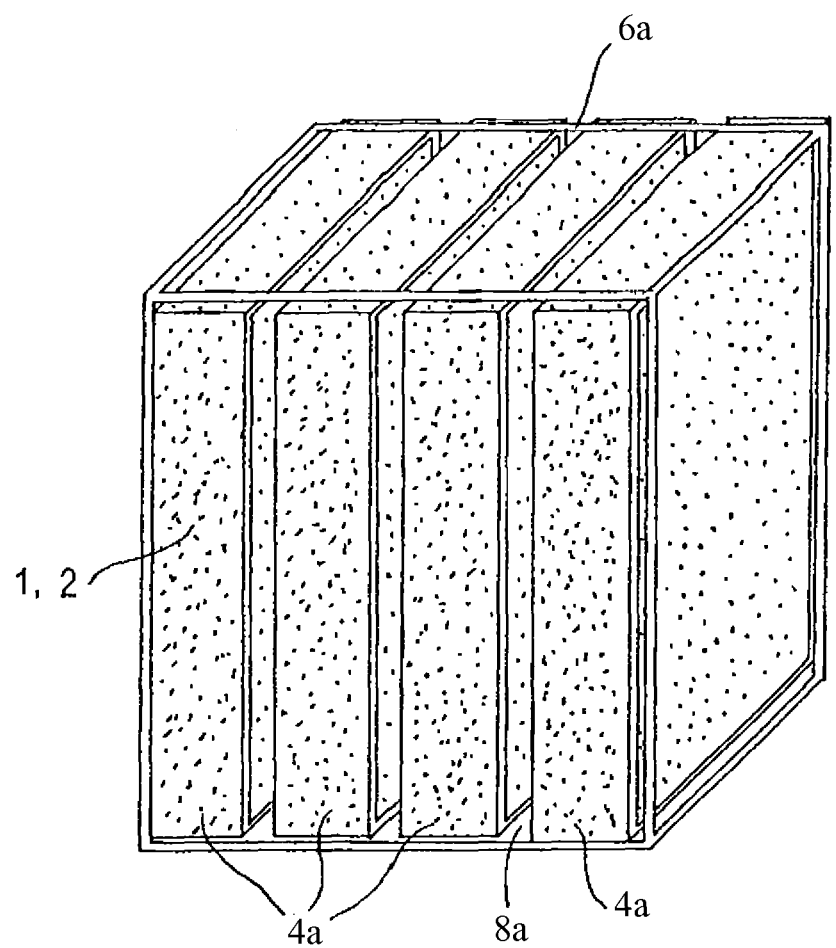
Figure 3A:
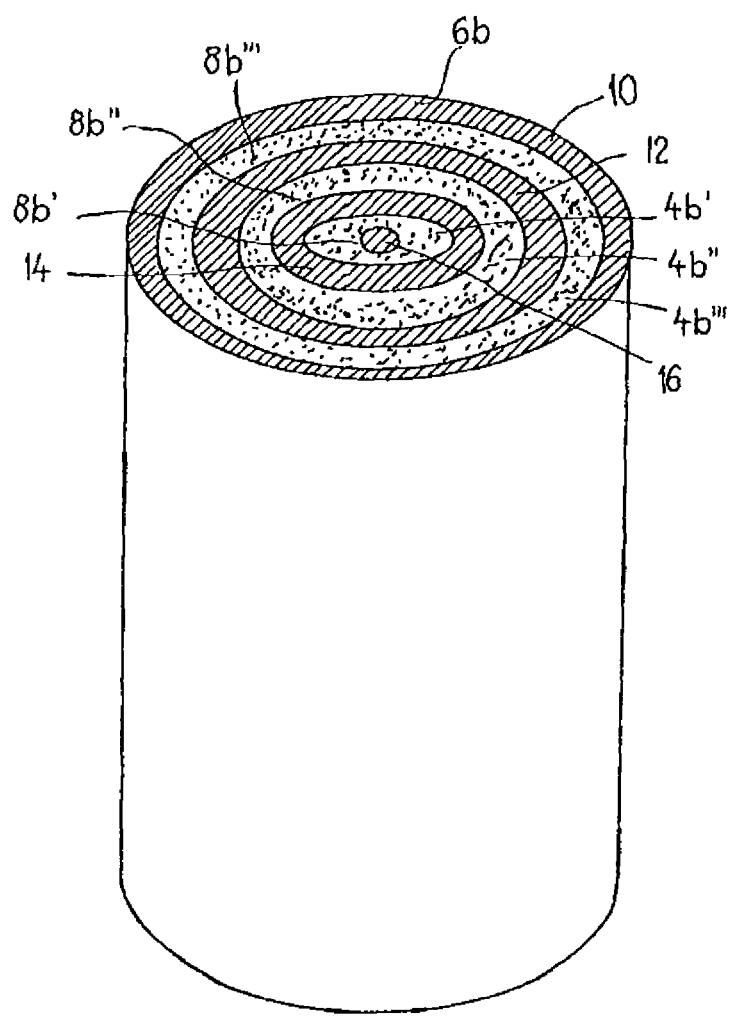
Figure 3B:
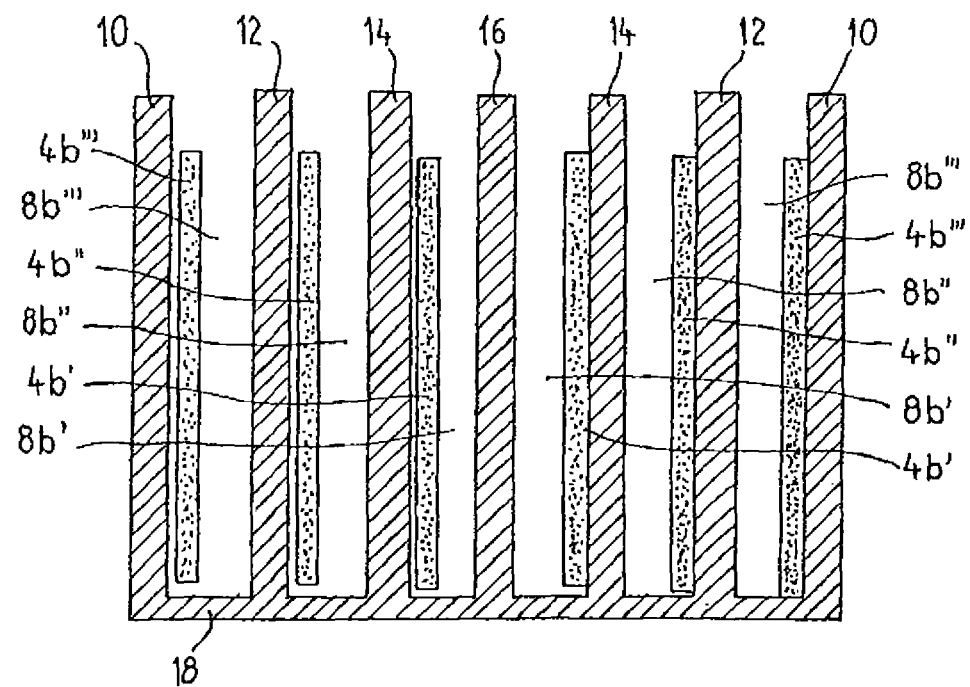

The present invention is further illustrated by the following examples together with the attached FIG. 1 showing the pressure and (outside) temperature progress over time measured for a test device comprising a molecular sieve according to the present invention, with the interior of the test device being filled in two consecutive steps with an organofluorine compound and with air;

FIG. 2 showing a first arrangement of a desiccant and/or molecular sieve in powder form to be comprised in an apparatus according to the present invention;

FIG. 3a showing a second arrangement of a desiccant and/or molecular sieve in powder form to be comprised in an apparatus according to the present invention in a perspective view; and FIG. 3b showing a longitudinal section of the arrangement shown in FIG. 3a.

EXAMPLE 1

50 g of ZEOCHEM® molecular sieve 5A (having a pore size of about 5 Å) was placed into the interior of a test device having a volume of 4.6 l. The interior was then evacuated down to less than 1 mbar.

Gaseous 1,1,1,3,4,4,4-heptafluoro-3-(trifluoromethyl)butan-2-one ("C5-fluoroketone", having a molecular size of about 7 Å) was filled into the interior up to a pressure of 412 mbar (marked as A in FIG. 1). In a second step, synthetic air was filled up to a total pressure of 826 mbar (marked as B in FIG. 1). The pressure (indicated by continuous line in FIG. 1) of the gas inside and the outside temperature (indicated by the broken line in FIG. 1) were monitored during the whole filling and observation process, the temporal progress of which is shown in FIG. 1.

After that, 1 g of water was injected into the interior of the test device, and again the pressure of the gas inside and the outside temperature were monitored during the whole filling and observation process (not shown).

As shown in FIG. 1, the total pressure after addition of the air (in the second step B) remained constant over the whole observation time. The corresponding temperature fluctuation shown by the broken line is within a very small range and is therefore insignificant. Thus, C5-fluoroketone was not adsorbed by the molecular sieve in this embodiment.

After water injection, a pressure increase of about 7 mbar was observed, which is much lower than the expected pressure increase in the absence of the molecular sieve (which would have been about 30 mbar, corresponding to the vapour pressure of water at room temperature) and thus this being indicative of water being adsorbed and/or absorbed by the molecular sieve. The adsorption of water was complete after about 6 hours. The total pressure at the end of the observation period was about 827 mbar and thus corresponded to the initial pressure after filling with the C5-fluoroketone and air, as shown in FIG. 1.

EXAMPLE 2

20 g of ZEOCHEM® molecular sieve 13X (having a are size of about 9 Å) was placed into the interior of a test device having a volume of about 0.075 l and the interior was then evacuated down to less than 1 mbar. After evacuation, gaseous C5-fluoroketone was filled into the interior up to a pressure of 400 mbar. After filling, the pressure dropped immediately down to a total pressure of 20 mbar after 20 min, meaning that about 95% of the C5-fluoroketone was adsorbed by the molecular sieve. Thereby, the test container warmed up significantly to about 40° C.

This embodiment shows that it can be preferable to use a molecular sieve with a pore size smaller than 9 Å, in particular when the organofluorine compound A is or comprises C5-fluoroketone. In other embodiments, however, a larger pore size equal to 9 Å or larger can also be possible; an example can be, that an organofluorine compound A of a larger kinetic diameter than the C5-fluoroketone is used or that some adsorption and/or absorption of the organofluorine compound A, in particular C5-fluoroketone, to the molecular sieve is acceptable.

According to the first aspect of the invention, also a desiccant is comprised in the apparatus/test device. Two exemplary arrangements of at least one of the molecular sieve 1 and the desiccant 2 (whichever is present) are given in FIG. 2 and in FIGS. 3a and 3b, respectively.

According to the specific embodiment shown in FIG. 2, four permeable containers in the form of sachets 4a comprising the at least one of the molecular sieve 1 and the desiccant 2 in powder form are arranged in frame 6a, here for example a cuboid frame 6a. The sachets 4a are arranged parallel to each other in a spaced-apart manner, such that between them a respective gap 8a is formed. Specifically, the sachets 4a are in the form of a sheet, the long sides of which corresponds more or less to the height and depth of the frame 6a. It is understood that any other form suitable for the respective purpose can be used.

According to embodiments in FIGS. 3a and 3b, the frame 6b is in cylindrical form and comprises an outermost hollow cylinder 10, in which two inner hollow cylinders 12, 14 are arranged concentrically, a middle hollow 12 cylinder and an innermost hollow cylinder 14. In the centre, a rod 16 is arranged coincidingly with the axis of the cylinders. Between the rod 16 and the innermost hollow cylinder 14, between the innermost hollow cylinder 14 and the middle hollow cylinder 12, and between the middle hollow cylinder 12 and the outermost hollow cylinder 10, radial gaps 8b', 8b'', 8b''', respectively, are formed. In each of the gaps 8b', 8b'', 8b''', a rolled sachet 4b', 4b'', 4b''', respectively, is arranged in a loose manner such that the surface of the sachets 4b', 4b'', 4b''' is not in full contact with the surface of the respective cylinders 14, 12, 10 and thus comprises a freely exposed surface area. The bottom end of the frame 6b can be closed, for example by an end plate 18, to safeguard that the at least one of the molecular sieve 1 and the desiccant 2 does not "fall out" of the gaps 8b', 8b'', 8b'''.

In embodiments, any number of cylinders 14, 12, 10 can be selected to provide respective inter-cylinder spaces or gaps 8b', 8b'', 8b''' for receiving and holding the at least one of the molecular sieve 1 and the desiccant 2 (whichever is present) in containers 4b', 4b'', 4b''', for example in sachets 4b', 4b'', 4b''', and for providing insulation-gas-accessible surface areas of the at least one of the molecular sieve 1 and the desiccant 2.

In general, the term "adsorbing" shall be understood broadly to encompass capturing or immobilizing molecules (as a whole or in dissociated form) on a surface of the sorbing agent (i.e. molecular sieve and/or desiccant) and can be done by any mechanism and in particular by physical or chemical binding the molecules to the sorbing agent. In general, the term "absorbing" shall be understood broadly to encompass capturing or immobilizing molecules (as a whole or in dissociated form) in the structure of the sorbing agent and can be done by any mechanism, and in particular by chemical binding the molecules (as a whole or in dissociated form) into the sorbing agent so that the absorbed molecules become part of the crystal structure of the sorbing agent.

In particular, the term "a molecular sieve" shall comprise also embodiments in which one molecular sieve or more than one molecular sieve is or are present. The term "a molecular sieve" is thus to be understood as at least one molecular sieve.

Throughout this application, terms like "preferable", "preferred", "advantageous", "favourable" and the like shall designate embodiments or exemplary features only, that are thus disclosed to be optional only.

LIST OF REFERENCE NUMERALS

1 molecular sieve
2 desiccant
4a planar sachet
4b', 4b'', 4b''' rolled sachets
6a frame, cuboid frame
6b cylindrical frame
8a space, inter-planar space, planar gaps
8b', 8b'', 8b''' space, inter-cylinder space, radial gaps
10 outermost hollow cylinder
12 middle hollow cylinder
14 innermost hollow cylinder
16 rod
18 end plate

The invention claimed is:

1. An apparatus for the generation, the distribution and/or the usage of electrical energy, said apparatus comprising a housing enclosing an insulating space and an electrical component arranged in the insulating space, said insulating space containing a dielectric insulation gas comprising an organofluorine compound A, the apparatus further comprising a molecular sieve arranged such as to come into contact with the insulation gas, the molecular sieve having an average pore size y greater than the molecular size of at least one decomposition product of the organofluorine compound A generated during operation of the apparatus, the adsorption capability and/or absorption capability of the molecular sieve for the organofluorine compound A being lower than for the at least one decomposition product, characterized in that the apparatus further comprises at least one desiccant arranged such as to come into contact with the insulation gas and in that the at least one desiccant is different from the molecular sieve, wherein the desiccant is not aluminium, aluminium oxide, activated alumina, activated carbon, zeolite, or combinations thereof, further characterized in that the apparatus includes at least one permeable sachet arranged in the insulation space containing at least one of the molecular sieve and the desiccant.

2. The apparatus according to claim 1, characterized in that the organofluorine compound A has a lower energy of adsorption and/or absorption to the molecular sieve than the at least one decomposition product.

3. The apparatus according to claim 1, characterized in that the molecular sieve has an average pore size y smaller than 15 Å.

4. The apparatus according to claim 3, characterized in that the molecular sieve has an average pore size y smaller than 13 Å.

5. The apparatus according to claim 3, characterized in that the molecular sieve has an average pore size y smaller than 11 Å.

6. The apparatus according to claim 3, characterized in that the molecular sieve has an average pore size y smaller than 9 Å.

7. The apparatus according to claim 3, characterized in that the molecular sieve has an average pore size y smaller than 7 Å.

8. The apparatus according to claim 3, characterized in that the molecular sieve has an average pore size y smaller than 6 Å.

9. The apparatus according to claim 3, characterized in that the molecular sieve has an average pore size y smaller than 5 Å.

10. The apparatus according to claim 1, characterized in that the molecular sieve is at least temporarily charged with the organofluorine compound A.

11. The apparatus according to claim 1, characterized in that the apparatus comprises temperature control means for controlling a temperature of the molecular sieve, in particular for regulating an amount of the organofluorine compound A in the dielectric insulation gas and/or for freeing the molecular sieve from at least a portion of the organofluorine compound A.

12. The apparatus according to claim 1, characterized in that the molecular sieve has an average pore size y which is at least 2.7 Å.

13. The apparatus according to claim 1, characterized in that the molecular sieve is a zeolite.

14. The apparatus according to claim 1, characterized in that the at least one desiccant has a higher hydrophilicity than the molecular sieve.

15. The apparatus according to claim 1, characterized in that the at least one desiccant is selected from the group consisting of: calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, montmorrilonite, phosphorpentoxide, and a cellulose filter.

16. The apparatus according to claim 1, characterized in that the organofluorine compound A is selected from the group consisting of fluoroethers, in particular hydrofluoromonoethers, fluoroketones and fluoroolefins, in particular hydrofluoroolefins, and mixtures thereof.

17. The apparatus according to claim 16, characterized in that the dielectric insulation gas comprises a fluoroketone containing from four to twelve carbon atoms.

18. The apparatus according to claim 16, characterized in that the dielectric insulation gas comprises a fluoroketone containing exactly five carbon atoms, or exactly six carbon atoms, or a mixture thereof.

19. The apparatus according to claim 1, characterized in that the dielectric insulation gas comprises a hydrofluoromonoether containing at least three carbon atoms.

20. The apparatus according to claim 1, characterized in that the dielectric insulation gas further comprises a carrier gas, the apparatus comprising a means for refilling after commissioning or during operation of the apparatus the carrier gas components adsorbing to and/or being absorbed by at least one of: the molecular sieve, the at least one desiccant, and a combination thereof.

21. The apparatus according to claim 20, characterized in that the carrier gas comprises an air component, in particular selected from the group consisting of carbon dioxide ($CO_2$), oxygen ($O_2$), nitrogen ($N_2$), and mixtures thereof, and preferably is air.

22. The apparatus according to claim 20 or 21, characterized in that the dielectric insulation gas comprises the organofluorine compound at a partial pressure corresponding to the vapour pressure of the organofluorine compound at the minimum operating temperature of the apparatus, the remainder of the dielectric insulation gas being or comprising the carrier gas.

23. The apparatus according to claim 1, characterized in that the housing encloses the insulation space in a gas-tight manner.

24. The apparatus according to claim 1, characterized in that the electrical component is a high voltage or medium voltage apparatus, or is a high voltage or medium voltage component.

25. The apparatus according to claim 1, characterized in that the apparatus is: a switchgear, in particular a gas-insulated switchgear (GIS), or a part and/or component thereof, a busbar, a bushing, a cable, a gas-insulated cable, a cable joint, a gas-insulated line (GIL), a transformer, a current transformer, a voltage transformer, a surge arrester, an earthing switch, a disconnector, a combined disconnector and earthing switch, a load-break switch, a circuit breaker, and/or any type of gas-insulated switch, a high voltage apparatus, a medium voltage apparatus, a low voltage apparatus, a direct-current apparatus, an air-insulated insulator, a gas-insulated metal-encapsulated insulator, sensors, a capacitor, an inductance, a resistor, a current limiter, a high voltage switch, a gas circuit breaker, a vacuum circuit breaker, a generator circuit breaker, a medium voltage switch, a ring main unit, a recloser, a sectionalizer, a low voltage switch, a distribution transformer, a power transformer, a tap changer, a transformer bushing, a power semiconductor device, a power converter, a converter station, a convertor building, a computing machine, and components and/or combinations of such devices.

26. The apparatus according to claim 1, characterized in that the housing comprises a chamber, in which the electrical component is contained, and a recycling system comprising at least one of the molecular sieve and the desiccant, and in that the housing is equipped with a compressor and a pump for pumping the dielectric insulation gas through at least one filter comprising the at least one of the molecular sieve and the desiccant.

27. The apparatus according to claim 1, characterized in that at least one of the molecular sieve and the desiccant is comprised in a region of the apparatus having a temperature lower than the average temperature present in the apparatus at operational conditions.

28. The apparatus according to claim 1, characterized in that the at least one permeable sachet arranged in the insulation space is a rolled sachet or a planar sachet.

29. The apparatus according to claim 1, characterized in that the at least one permeable sachet arranged in the insulation space includes a cover which is permeable at least for water.

30. The apparatus according to claim 1, characterized in that two or more permeable sachets are arranged together in a cuboid or cylindrical frame in the insulation space and spaced apart from one another by gaps through which the insulation gas is received.

31. The apparatus according to claim 1, characterized in that the molecular sieve has an average pore size y which is at least 2.8 Å.

32. The apparatus according to claim 1, characterized in that the molecular sieve has an average pore size y which is at least 2.9 Å.

33. The apparatus according to claim 1, characterized in that the molecular sieve has an average pore size y which is at least 3 Å.

34. The apparatus according to claim 1, characterized in that the at least one permeable sachet arranged in the insulation space includes a cover which is a semipermeable membrane which is selectively permeable for water.

35. The apparatus according to claim 1, characterized in that the at least one desiccant includes one of calcium sulphate, magnesium sulphate, and sodium sulphate.

36. An apparatus for the generation, the distribution and/or the usage of electrical energy, said apparatus comprising a housing enclosing an insulating space and an electrical component arranged in the insulating space, said insulating space containing a dielectric insulation gas comprising an organofluorine compound A, characterized in that the apparatus further comprises at least one desiccant arranged such as to come into contact with the insulation gas, the at least one desiccant being selected from the group consisting of calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, lithium aluminium hydride, montmorillonite, phosphorpentoxide, and a cellulose filter, the apparatus further comprising in addition a molecular sieve different from the at least one desiccant and arranged such as to come into contact with the insulation gas.

37. The apparatus according to claim 36, further characterized in that the apparatus includes at least one permeable sachet arranged in the insulation space containing at least one of the molecular sieve and the desiccant.

38. An apparatus for the generation, the distribution and/or the usage of electrical energy, said apparatus comprising a housing enclosing an insulating space and an electrical component arranged in the insulating space, said insulating space containing a dielectric insulation gas comprising an organofluorine compound A, characterized in that the apparatus further comprises a molecular sieve and a desiccant arranged such as to come into contact with the insulation gas, the molecular sieve having an average pore size y greater than the molecular size of at least one decomposition product of the organofluorine compound A generated during operation of the apparatus, the adsorption capability and/or absorption capability of the molecular sieve for the organofluorine compound A being lower than for the at least one decomposition product, further characterized in that the desiccant is different from the molecular sieve and that at least one of the molecular sieve and the desiccant is or are in powder form, and in that the at least one of the molecular sieve and the desiccant is a binder-free powder.

39. The apparatus according to claim 38, characterized in that at least one of the molecular sieve and the desiccant is comprised in a permeable sachet arranged in the insulation space.

40. An apparatus for the generation, the distribution and/or the usage of electrical energy, said apparatus comprising a housing enclosing an insulating space and an electrical component arranged in the insulating space, said insulating space containing a dielectric insulation gas comprising an organofluorine compound A, the apparatus further comprising a molecular sieve arranged such as to come into contact with the insulation gas, the molecular sieve having an average pore size y greater than the molecular size of at least one decomposition product of the organofluorine compound A generated during operation of the apparatus, the adsorption capability and/or absorption capability of the molecular sieve for the organofluorine compound A being lower than for the at least one decomposition product, characterized in that the apparatus further comprises at least one desiccant arranged such as to come into contact with the insulation gas and in that the at least one desiccant is different from the molecular sieve, wherein the desiccant is not aluminium, aluminium oxide, activated alumina, activated carbon, zeolite, or combinations thereof, further characterized in that the apparatus includes at least one permeable sachet arranged in the insulation space containing at least one of the molecular sieve and the desiccant, characterized in that the at least one sachet is arranged in a cylindrical frame with a plurality of concentric hollow cylinder elements with the sachets there between.

* * * * *